United States Patent Office 3,003,087
Patented Oct. 3, 1961

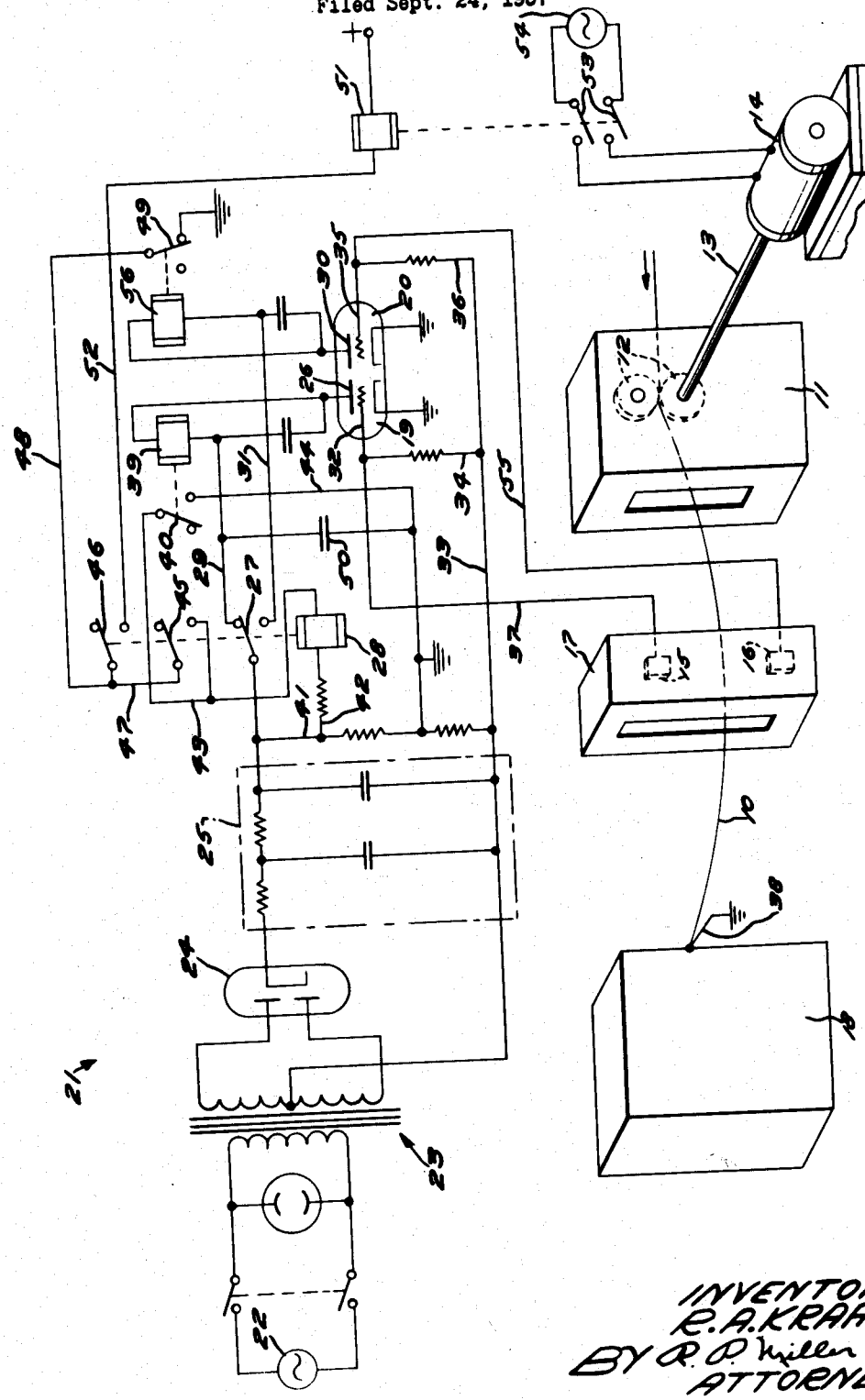

3,003,087
WIRE FEED CONTROL SYSTEM
Robert A. Kraay, Lincroft, N.J., assignor to Western Electric Company, Incorporated, New York, N.Y., a corporation of New York
Filed Sept. 24, 1957, Ser. No. 685,847
2 Claims. (Cl. 317—149)

This invention relates to a wire feed control system, and more particularly to a novel circuit for controlling the feed of wire from one machine or work station to another.

In the present invention, the disclosed circuit is used to control the feeding of wire from one machine, such as a straightening machine, to a machine which uses a relatively small amount of wire per operating cycle, as, for example, a wire molding press. The control circuit allows a predetermined amount of slack wire to accumulate between the two machines to enable the straightening machine, which feeds the wire, to operate intermittently, thereby feeding and supplying the wire molding press with enough wire to handle many operating cycles. It will be readily understood from the following description, however, that the invention is equally applicable to many other types of wire feeding systems or motor control circuits.

In the past, control circuits of this type making use of electron tubes operate on the order of a flip-flop circuit which necessitates either one or the other of the tubes conducting at all times. During the periods when the feeding mechanism is operating one tube will be conducting, and during the periods when the feeding mechanism is inoperative, the other tube must conduct thereby necessitating frequent replacement of tubes.

It is therefore one object of this invention to provide a novel control circuit for automatically starting and stopping a motor.

Another object of the invention is to provide a control circuit for feeding wire from one machine or work station to another, and further, to feed sufficient slack wire between the two stations in order that the feed mechanism will be required to operate only once to many cycles of operation of the machine taking up the wire.

It is a further object of the invention to provide an electron tube wire feed control circuit wherein the tubes only conduct instantaneously and continuous conduction is not required for prolonged operation of the circuit.

With these and other objects in view, the present invention contemplates a wire feed control circuit using two electron tubes; one for starting a wire feed motor upon conduction thereof, and the other for stopping the motor upon conduction thereof. A wire is fed from one machine or work station, for example, from a wire straightening station provided with feed rollers to which a motor is connected, to a molding machine which may take or use up small amounts of wire at a time. However, the invention would be equally applicable for a continuous take-up. Between the two machines are placed two contacts, one above the other, between which the wire is fed. When the take-up molding machine has absorbed most of the slack in the wire, the wire will contact the upper contact thereby allowing one tube to conduct which actuates a relay system. The relay system starts the wire feeding motor and prevents the tube from further conduction at that time. The wire is fed from the straightening station until sufficient slack is accumulated between the two machines so that the wire contacts the lower contact and thereby produces conduction of the other tube. The conduction of the second tube deactuates the relay system which in turn stops the wire feeding motor and prevents the second tube from further conduction at that time.

Other objects, advantages and novel features of the invention will become apparent upon consideration of the following detailed description in conjunction with the accompanying drawing, wherein:

The drawing discloses a control circuit as one embodiment of the invention and provide an example of how the circuit is used to control the intermittent feeding of wire from one machine to another and to control the amount of wire stock therebetween.

Attention is now directed to the drawing wherein a wire 10 is fed from one working station, for example a wire straightener 11, to another working station, such as a molding press 18. The wire 10 is fed by means of feed rollers 12 driven by a shaft 13 connected to a motor 14 of any standard type. The wire 10 is fed between two spaced contacts 15 and 16, which may be contained in a housing 17 and thence to a take-up machine such as a wire molding press 18. The wire molding press 18 uses only a few inches of wire for each operating cycle, the time of which may vary from one to four minutes. A specific amount of slack in the wire 10 is accumulated between the wire straightener 11 and the wire mold press 18 so that the wire mold press 18 may take up the accumulated wire until the slack is consumed and there is a necessity to again feed more wire.

The starting and stopping of the motor 14 to drive the feedrollers 12 is controlled by the wire 10 contacting the contacts 15 and 16. The control circuit is provided with two electron tubes 19 and 20 which may be one dual triode tube as shown. The tubes are supplied with a D.C. plate voltage from a source generally designated by the numeral 21, which may consist of, for example, an A.C. supply 22, a transformer 23, a rectifier 24 and a filter circuit 25. Plate voltage is applied to either the plate 26 of tube 19 through contact 27 of relay 28 and conductor 29 or to plate 30 of tube 20 through contact 27 of relay 28 and conductor 31 depending upon whether the relay 28 is actuated or deactuated. Normally the tubes 19 and 20 are prevented from conducting by a cut-off bias applied to the grid 32 of tube 19 through conductors 33 and 34 and to the grid 35 of tube 20 through conductors 33 and 36.

Assuming that the wire 10 and the relay contacts are in the position shown in the drawing, the operation of the control circuit is as follows: When the wire molding press 18 takes up the slack in the wire 10, the wire engages the upper contact 15 thereby grounding the cut-off bias applied to the tube 19 through conductor 37, contact 15, wire 10 to any convenient ground connection 38 of the wire 10. Since the plate voltage has already been applied to the tube 19, the removal of the cut-off bias therefrom will enable it to conduct, thereby actuating the relay 39. Actuation of the relay 39 operates a relay contact 40 which completes a circuit from the source of potential 21 through conductors 41 and 42, relay 28, conductor 43, contact 40 of relay 39 and conductor 44 to ground. The flow of current through this circuit actuates the relay 28 which operates the contacts 27, 45 and 46. The operation of contact 27 removes the plate voltage from the tube 19 and applies plate voltage to the tube 20 through conductor 31 and thereby deactuates the relay 39. The closing of contact 45 completes a circuit from the source of potential 21 through conductors 41 and 42, relay 28, the lower portion of conductor 43, contact 45 of relay 28, conductors 47 and 48 and contact 49 of relay 56 to ground, thereby producing a locking circuit for relay 28 to render it independent of relay 39. To prevent the tube 19 from becoming non-conductive and the relay 39 from deactuating before the locking circuit becomes effective, capacitor 50 is connected from ground to conductor 29. Capacitor 50 having received a charge equal to the plate potential applied to the tube 19, discharges through tube 19 to keep the tube conducting and the relay 39 actuated just that amount of time necessary to allow the locking circuit for relay 28 to operate.

The closing contact 46, upon actuation of relay 28, completes a circuit from a positive side of the voltage source through power relay 51, conductor 52, contact 46 of relay 28, conductor 48 and contact 49 of relay 56 to ground causing the actuation of the power relay 51. Power relay 51 closes the contacts 53 to connect a suitable power source 54 to start the motor 14 and thereby feeding the wire 10. Further engagement of the wire 10 to the contact 15 will produce no additional result because the plate voltage has been removed from tube 19 and applied to tube 20 preparing the tube 20 for conduction.

The motor 14 will continue to feed out wire 10 until enough wire is accumulated until the wire 10 engages the lower contact 16 which provides a ground 38 through the wire 10 and conductor 55 for the cut-off bias of the tube 20. The tube 20 has plate potential applied to it through contact 27 of relay 28 and conductor 31 and thereby conducts, actuating relay 56. Actuation of relay 56 closes contact 49 which breaks both the locking circuit for relay 28 and the circuit for supplying power to the relay 51, thereby removing the power from motor 14 by opening the contacts 53 and stopping the feeding of the wire 10. Upon breaking of the locking circuit of relay 28, relay 28 deactuates releasing contact 27 which removes plate potential from the tube 20 and reapplies the plate potential to tube 19. Tube 20 thereupon ceases conduction, deactuating the relay 56, and tube 19 is now prepared for conduction. Continuous engagement of the wire 10 with the contact 16 brings no further results, for the tube 20 is unable to conduct with plate voltage removed therefrom. There is now enough slack in the wire 10 to feed the wire molding press for many operating cycles until the wire 10 engages the upper contact 15 the operating cycle repeats itself.

The connection between the control circuit and the power relay may be made to other parts of the circuit, for example, extra contacts may be added to relays 39 and 56 with a holding circuit included with the power relay. It is to be understood that numerous other variations may be made to the control circuit and the circuit may be made to control numerous modifications of the hereinabove described apparatus to achieve similar results which will be within the spirit and scope of the present invention.

What is claimed is:

1. In a control circuit, the combination which comprises a first electron tube and a first and a second contact, said first electron tube becoming conductive when the first contact is closed, a second electron tube becoming conductive when the second contact is closed, a relay system, said system having a non-electronic locking circuit, a first and a second relay, said first relay actuated by the conduction of the first tube for energizing the relay system upon actuation of the first relay, means operated by the energization of said relay system causing the first tube to become non-conductive thereby de-actuating the first relay and causing the locking of the relay system, said second relay actuated by the conduction of the second tube for de-energizing the relay system upon actuation of the second relay, and means operated by the de-energization of the relay system causing the second tube to become non-conductive thereby de-actuating the second relay and causing the unlocking of the relay system.

2. In a control system, the combination which comprises a relay system having a non-electronic locking circuit, first and second relay means for operating said relay system, first and second electron tubes connected respectively to said first and second relay means causing, upon the conduction of either tube operation of the corresponding relay means, means controlled by said relay system for applying potential to an electrode of said first tube to condition the first relay means for operation and for preventing the application of a conditioning potential to an electrode of the second tube to prevent said second relay means from operating when said relay system is de-energized, means for applying a conditioning potential to an electrode of said second tube to condition the second relay means for operation and for preventing the application of a conditioning potential to an electrode of the first tube to prevent the first relay means from operating when said relay system is energized, means for operating said first tube to energize and lock the relay system thereby preventing the first relay means from further operation, and means for operating the second tube to de-energize and unlock the relay system thereby preventing the second relay means from further operation.

References Cited in the file of this patent

UNITED STATES PATENTS

| | | |
|---|---|---|
| 2,691,121 | Buchner | Oct. 5, 1954 |
| 2,773,222 | Chauvin | Dec. 4, 1956 |
| 2,828,455 | Kraay et al. | Mar. 25, 1958 |